US012793562B2

(12) United States Patent
Zhao et al.

(10) Patent No.: US 12,793,562 B2
(45) Date of Patent: Nov. 10, 2026

(54) METHOD, DEVICE AND SYSTEM OF INTELLIGENT COOPERATIVE PERCEPTION (ICOOPER) FRAMEWORK

(71) Applicant: Intelligent Fusion Technology, Inc., Germantown, MD (US)

(72) Inventors: Qi Zhao, Germantown, MD (US); Yi Li, Germantown, MD (US); Xin Tian, Germantown, MD (US); Genshe Chen, Germantown, MD (US); Khanh Pham, Kirtland AFB, NM (US); Erik Blasch, Arlington, VA (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 1228 days.

(21) Appl. No.: 17/734,840

(22) Filed: May 2, 2022

(65) Prior Publication Data

US 2025/0391280 A1 Dec. 25, 2025

Related U.S. Application Data

(60) Provisional application No. 63/185,250, filed on May 6, 2021.

(51) Int. Cl.
*G08G 5/56* (2025.01)
*G06N 3/04* (2023.01)
(Continued)

(52) U.S. Cl.
CPC ............... *G08G 5/56* (2025.01); *G06N 3/044* (2023.01); *G06N 3/0464* (2023.01); *G06N 3/092* (2023.01); *G06T 17/00* (2013.01)

(58) Field of Classification Search
CPC ........ G08G 5/56; G06N 3/044; G06N 3/0464; G06N 3/092; G06T 17/00
See application file for complete search history.

(56) References Cited

U.S. PATENT DOCUMENTS 11,507,084 B2 * 11/2022 Sharma ................ G06V 10/764
12,536,907 B2 * 1/2026 Sivanesan ........ G08G 1/096775
(Continued)

*Primary Examiner* — Tyler J Lee
(74) *Attorney, Agent, or Firm* — ANOVA LAW GROUP, PLLC

(57) ABSTRACT

An intelligent cooperative perception system for autonomous air vehicles (AAVs) comprises at least two AAVs, each of the at least two AAVs being provided with at least one object detection sensor. The at least two AAVs are configured to perform: an information-centric networking (ICN) scheme configured for flexible and efficient communications among the at least two AAVs and infrastructure sensors; a deep reinforcement learning scheme including selecting sensory data to be transmitted, selecting data compression format, mitigating wireless network load, and reducing network latency; an efficient real-time compression scheme of 3D point cloud streams based on recurrent neural network (RNN) algorithms and including significantly reducing data amount exchanged among the at least two AAVs, network load and delay while maintaining accurate cooperative perception; and an effective point cloud fusion scheme including compensating network latency and accurately fusing sensed data from the at least two AAVs and the infrastructure sensors.

13 Claims, 7 Drawing Sheets

(51) Int. Cl.

| | |
|---|---|
| ***G06N 3/044*** | (2023.01) |
| ***G06N 3/0464*** | (2023.01) |
| ***G06N 3/09*** | (2023.01) |
| ***G06N 3/092*** | (2023.01) |
| ***G06T 17/00*** | (2006.01) |

(56) References Cited

U.S. PATENT DOCUMENTS

| | | | | |
|---|---|---|---|---|
| 2014/0267388 | A1* | 9/2014 | Smyth | B60K 35/29<br>345/173 |
| 2018/0091615 | A1* | 3/2018 | Seedorf | H04L 67/568 |
| 2019/0220003 | A1* | 7/2019 | Sharma | G01C 21/32 |
| 2020/0104323 | A1* | 4/2020 | Kam | G06F 16/906 |
| 2021/0110713 | A1* | 4/2021 | Silva | H04W 4/44 |
| 2021/0192344 | A1* | 6/2021 | Fujimoto | B60G 17/015 |
| 2021/0232922 | A1* | 7/2021 | Zhang | G06N 3/092 |
| 2022/0144309 | A1* | 5/2022 | Hwu | G06N 3/04 |
| 2022/0287083 | A1* | 9/2022 | Gomes Baltar | H04W 74/0808 |
| 2022/0343241 | A1* | 10/2022 | Jha | G08G 1/166 |
| 2022/0353732 | A1* | 11/2022 | Filippou | H04W 28/0289 |
| 2023/0156826 | A1* | 5/2023 | Palermo | H04W 76/10<br>370/329 |
| 2023/0377460 | A1* | 11/2023 | Sivanesan | G08G 1/096775 |
| 2024/0088959 | A1* | 3/2024 | Lee | G06N 3/092 |

* cited by examiner

METHOD, DEVICE AND SYSTEM OF INTELLIGENT COOPERATIVE PERCEPTION (ICOOPER) FRAMEWORK

CROSS REFERENCE TO RELATED APPLICATION

The present application claims priority to U.S. Provisional Application 63/185,250, filed on May 6, 2021, the entire content of which is incorporated herein by reference.

GOVERNMENT RIGHTS

This invention was made with Government support under Contract No. FA864921P0166, awarded by the United States Air Force. The U.S. Government has certain rights in this invention.

FIELD

The disclosure generally relates to the field of autonomous air vehicle (AAV) technology, more particularly, relates to method, device and system of intelligent cooperative perception (iCOOPER) framework for AAVs.

BACKGROUND

Three-dimensional (3D) sensors, such as light detection and ranging (LiDAR), stereo cameras, and radar on an AAV have limited visibility due to occlusions, sensing range, and extreme weather and lighting conditions. Cooperative perception can enable an AAV to access sensory information from other AAVs and infrastructure sensors, which can remove blind spots, extend view coverage, and improve object detection precision for better safety and path planning. 3D LiDARs/cameras/radars on AAVs can generate a massive amount of real-time data traffic, even over the capacity of next-generation (5G) wireless networks. On the other hand, a lot of important information will be lost if AAVs only share the types and locations of detected objects. Connected AAVs should intelligently select the information to transmit.

Therefore, there is a need for method, device and system of intelligent cooperative perception (iCOOPER) framework for AAVs, which can overcome the above and other deficiencies.

SUMMARY

One aspect of the present disclosure provides an intelligent cooperative perception system for autonomous air vehicles (AAVs). The system comprises at least two AAVs, each of the at least two AAVs being provided with at least one object detection sensor. The at least two AAVs are configured to perform: an information-centric networking (ICN) scheme configured for flexible and efficient communications among the at least two AAVs and infrastructure sensors; a deep reinforcement learning scheme including selecting sensory data to be transmitted, selecting data compression format, mitigating wireless network load, and reducing network latency; an efficient real-time compression scheme of 3D point cloud streams based on recurrent neural network (RNN) algorithms and including significantly reducing data amount exchanged among the at least two AAVs, network load and delay while maintaining accurate cooperative perception; and an effective point cloud fusion scheme including compensating network latency and accurately fusing sensed data from the at least two AAVs and the infrastructure sensors.

Another aspect of the present disclosure provides a device of an intelligent cooperative perception. The device comprises an AAV, and the AAV comprises at least one local sensor, a perception module, a localization module, a mapping module, a path planner module and a controller. The perception module analyzes point cloud data from at least one local sensor and sensors of other AVVs and recognizes detected objects from the point cloud data using a convolutional neural network (CNN) scheme. The localization module publishes the AAV's position, orientation and velocity state. The mapping module generates a global map with positions of the detected objects. The path planning module computes a path for the AAV and handles emergency events. And the controller issues commands to control the AAV based on the path.

Another aspect of the present disclosure provides a method implemented in an intelligent cooperative perception system for autonomous air vehicles (AAVs). The iCOOPER system comprises at least two AAVs and each of the at least two AAVs is provided with at least one object detection sensor. The method comprises: performing an information-centric networking (ICN) scheme configured for flexible and efficient communications among the at least two AAVs and infrastructure sensors; performing a deep reinforcement learning scheme including selecting sensory data of the at least one object detection sensor to be transmitted, selecting data compression format, mitigating wireless network load, and reducing network latency; performing an efficient real-time compression scheme of 3D point cloud streams based on recurrent neural network (RNN) algorithms and including significantly reducing data amount exchanged among the at least two AAVs, network load and delay while maintaining accurate cooperative perception; and performing an effective point cloud fusion scheme including compensating network latency and accurately fusing sensed data from the at least two AAVs and the infrastructure sensors.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
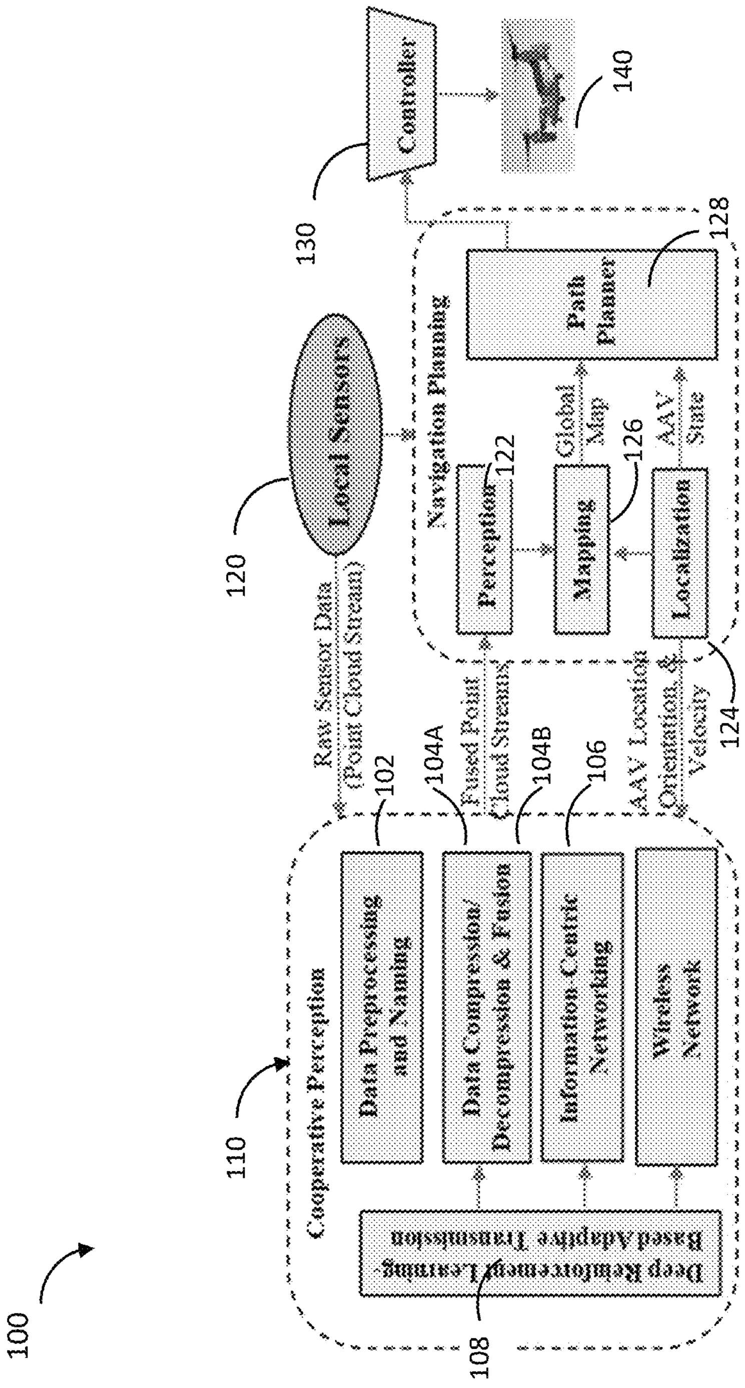
FIG. 1 illustrates an exemplary system architecture of intelligent cooperative perception according to various embodiments of the present disclosure.

Reference will now be made in detail to exemplary embodiments of the disclosure, which are illustrated in the accompanying drawings. Wherever possible, the same reference numbers will be used throughout the drawings to refer to the same or similar parts.

Cooperative perception can enable autonomous air vehicles (AAVs) to share sensory information with other AAVs and infrastructure, extending coverage and enhancing the detection accuracy of surrounding objects for better safety and path planning. Herein, the present disclosure discloses a distributed deep reinforcement learning-based intelligent cooperative perception system with information-centric networking for AAVs. The present disclosure further discloses a point cloud compression method, device and system for the distributed deep reinforcement learning-based intelligent cooperative perception system.

The technical features of the present disclosure may include: 1) information-centric networking (ICN) for flexible and efficient communications; and 2) deep reinforcement learning to select the information to transmit as well as data compression format, mitigating network load, reducing latency, and optimizing cooperative perception. The disclosed embodiments may include the following aspects. 1) The ICN-based communication can allow AAVs to flexibly name, publish, request and retrieve/subscribe sensory information for cooperative perception. It can also allow the name and access to the data based on the sensed region with multiple resolutions. 2) Deep reinforcement learning-based adaptive transmission can dynamically determine the optimal transmission policy of real-time sensed data based on the information importance, location and trajectory, as well as wireless network state to achieve the best cooperative perception in terms of object detection precision and latency. 3) Efficient real-time compression of 3D point cloud streams can significantly reduce the amount of data exchanged among AAVs as well as network load and delay while maintaining accurate cooperative perception based on Recurrent Neural Network (RNN). No important information gets lost. 4) Effective point cloud fusion can compensate for network latency and accurately fuse the sensed data from different AAVs.

As described above, 3D sensors, such as LiDAR, stereo cameras, and radar on an AAV have limited visibility due to occlusions, sensing range, and extreme weather and lighting conditions. Cooperative perception enables AAVs to access sensory information from other AAVs and infrastructure sensors, which removes blind spots, extends view coverage, and improves object detection precision for better safety and path planning. 3D LiDARs/cameras/radars on AAVs generate a massive amount of real-time data traffic, even over the capacity of next-generation (5G) wireless networks. On the other hand, a lot of important information will be lost if AAVs only share the types and locations of detected objects. Connected AAVs should intelligently select the information to transmit.

A deep reinforcement learning-based intelligent cooperative perception (iCOOPER) system supported by information-centric networking to enable AAVs is disclosed herein to achieve accurate and fast object detection. For example, the following fundamental problems are addressed. 1) How to efficiently discover and access the information captured by other AAVs? The solution disclosed herein is the information-centric networking (ICN) and region-based naming of sensed information. 2) How to select the information that should be transmitted as well as the data compression format for achieving optimal cooperative perception, under varying wireless bandwidth and delay constraints? The solution disclosed herein is the deep reinforcement learning (DRL)-based adaptive transmission scheme. 3) How to efficiently compress 3D point cloud streams in real-time? The solution disclosed herein is Recurrent Neural Network (RNN)-based point cloud stream compression. 4) How to fuse data contributed by different AAVs? The solution disclosed herein is velocity vector estimation at the sender and network latency compensation at the receiver.

FIG. 1 shows the overall system design and the architecture of an intelligent cooperative perception system 100 according to one embodiment of the present disclosure. The system 100 shows the overall system design and the architecture. The system 100 may include a Cooperative Perception subsystem 110 that obtains cooperative sensory information from local sensors 120 and gives it to the Perception module 122 via an interface similar to how the Perception module accesses the information from its local sensors.

The Cooperative Perception subsystem 110 may include the following exemplary modules: 1) Data Preprocessing and Naming 102: Organize sensory data based on its region in an Octree structure with multiple resolutions; 2) Data Compression 104A: Efficient compression of point cloud data generated by the sensors; 3) Data Decompression & Fusion 104B: decompress the received data and combine it with local point cloud; 4) Information-Centric Networking (ICN) 106: flexibly publish, request and retrieve data for cooperative perception; and 5) Deep Reinforcement Learning-Based Adaptive Transmission Scheme 108: Dynamically decide requested data and data format (resolution and compression).

It should be noted that in AAVs, the Perception module 112 analyzes the point cloud data from the sensors and recognizes objects using detection algorithms such as CNN. The Localization module 124 publishes the AAV's position (as accurate as centimeters), orientation, and velocity state. The Mapper/Mapping 126 generates a global map with positions of detected objects. The path Planner 128 computes a path and handles emergency events. The Controller 130 issues commands to control the AAV 140.

Figure 2:
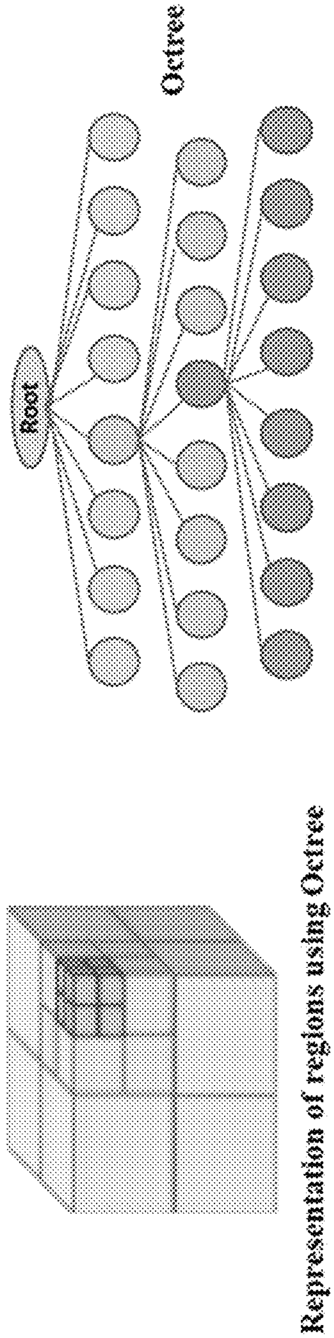
FIG. 2 illustrates an overview of an exemplary octree concept according to various embodiments of the present disclosure.

The information-centric networking 106 enables connected AAVs to exchange sensed information and form an edge computing cloud for cooperative perception. The sensory information is named and accessed based on its 3D regions. The representation of regions is illustrated using Octree with multiple resolutions, each node in the Octree, i.e., each region, has a global unique identifier to distinguish it from other regions, as well as associated attributes (data), as shown in FIG. 2 in which an overview of this Octree concept is described.

An AAV can publish the availability of information sensed for a list of regions as well as data resolution, best quality (a measure of data completeness and compression), and its velocity vector (for prediction of future sensed region).

AAVs can obtain real-time streams of 3D point clouds from other AAVs and zoom in and zoom out a region by requesting/subscribing to a list of regions with the desired data format (indicating the requested data resolution and compression) and the time duration to subscribe to this data stream.

Figure 3:
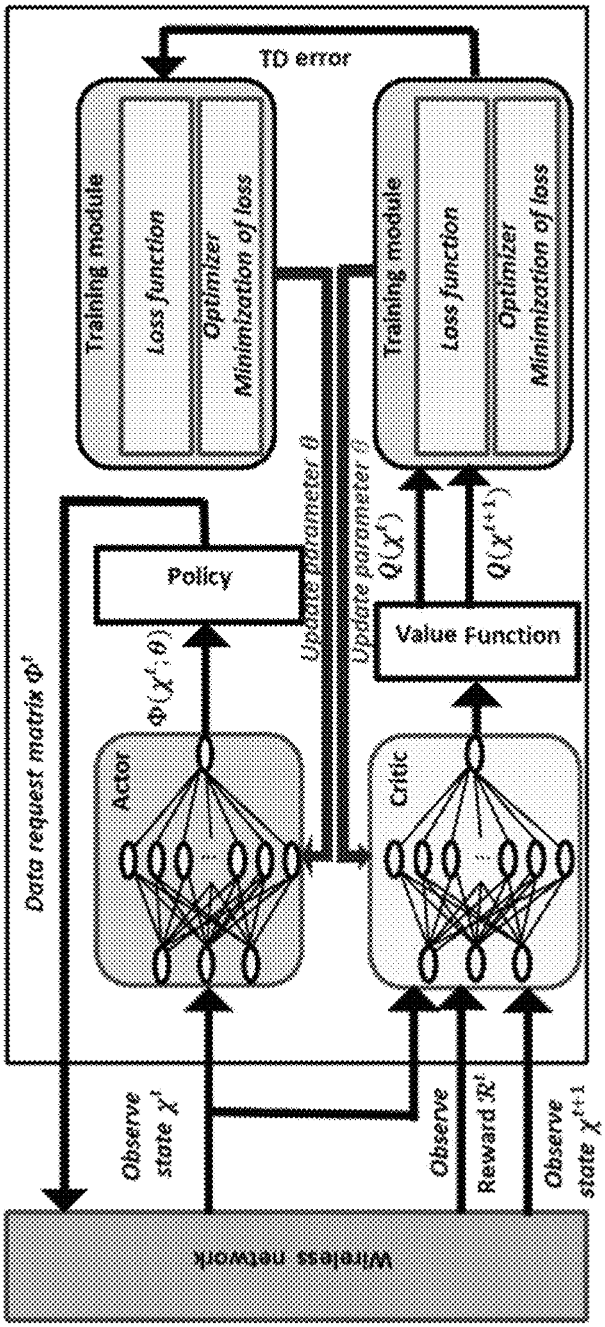
FIG. 3 illustrates a diagram of an exemplary adaptive data selection and scalable transmission algorithm according to various embodiments of the present disclosure.

The adaptive data selection and scalable transmission is used for the data processing in the disclosed iCOOPER system. The related algorithms are shown in FIG. 3. At the beginning of a control epoch, t, an AAV analyzes local sensor data and determines a set of regions $\mathcal{S}=\{1, 2, \ldots s \ldots S\}$ for data request based on lacunae in the available sensor data. The importance (weight) $\omega_s$ of each region s is determined based on its relative location and AAV's trajectory. Wireless network state $\chi^t$ (network bandwidth and delay) is observed. Deep reinforcement learning is employed to determine the data requested for different regions in epoch t, $$\Phi^t = (\phi_s^t : s \in \mathcal{S})$$

with $$\phi_s^t$$

as data resolution and compression format requested for region s.

The objective is to obtain an optimal data request control policy $\Phi^+$ that maximizes the expected discounted long-term reward, subject to bandwidth and delay constraints. The reward $R(\chi, \Phi)$ is a function of request-response time and object detection precision weighted over all the regions. The example algorithm can be developed based on recent advances in deep reinforcement learning, such as Actor Critic neural networks.

To address the bandwidth bottleneck of wireless network, advanced point cloud compression techniques are adopted in the present disclosure, which includes the following exemplary aspects. 1) A point cloud captures the 3D view, from the perspective of a vehicle, of static (e.g., buildings) and dynamic (e.g., other vehicles, pedestrians) objects in the environment. 2) Conventional image/video compression approaches do not work well for point clouds due to the sparseness and data structure. 3) A point cloud compression method using Recurrent Neural Network (RNN) and residual blocks to progressively compress requested sensor data for real-time transmission is adopted and implemented in this disclosure. 4) This approach needs much less volume while giving the same decompression accuracy compared to generic octree point cloud compression methods.

Figure 4:
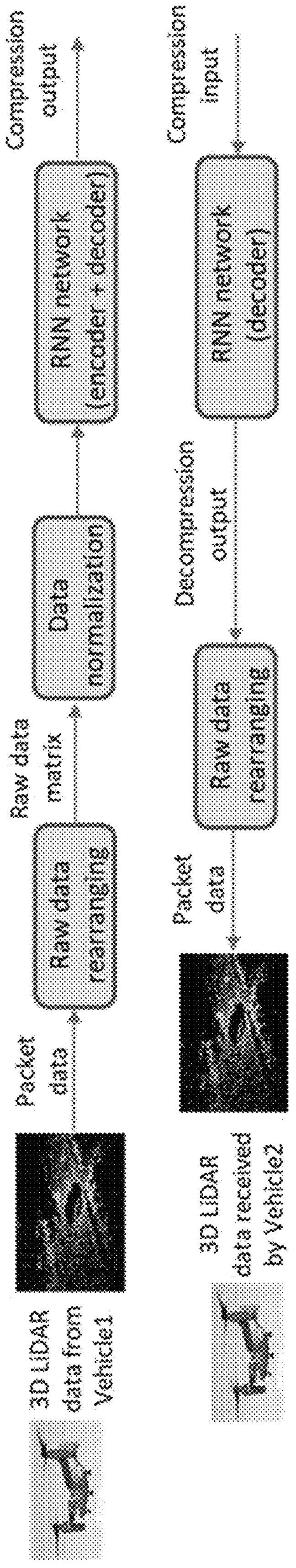
FIG. 4 illustrates a process of an example point cloud compression using recurrent neural network according to various embodiments of the present disclosure.
Figure 6:
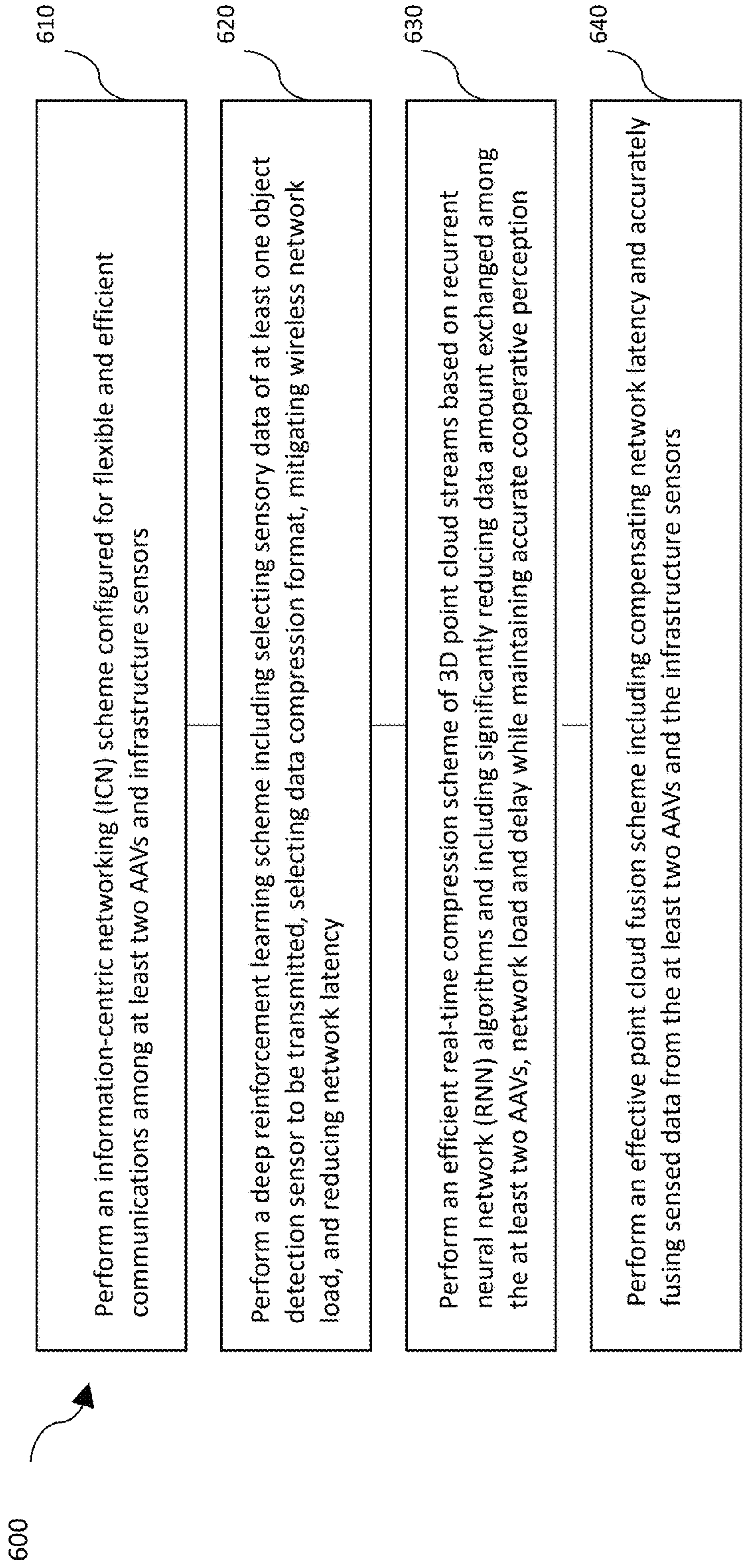
FIG. 6 illustrates an example computer-implemented method of point cloud compression of an intelligent cooperative perception (iCOOPER) for autonomous air vehicles (AAVs) according to one embodiment of the present disclosure.

FIG. 6 illustrates a process 400 of an example point cloud compression using recurrent neural network according to various embodiments of the present disclosure. As shown in FIG. 4, the process 400 may include: a first 3D LiDAR captures data from a first vehicle; the data packets are transmitted and the raw data are rearranged to form a raw data matrix; the data matrix is normalized; an RNN network is used to compress the data; the compressed data is then decompressed through the RNN network; the raw data after decompression are rearranged; and the data packets after the rearranging are transmitted to form a second 3D LiDAR data, which are then received by a second vehicle.

Figure 5:
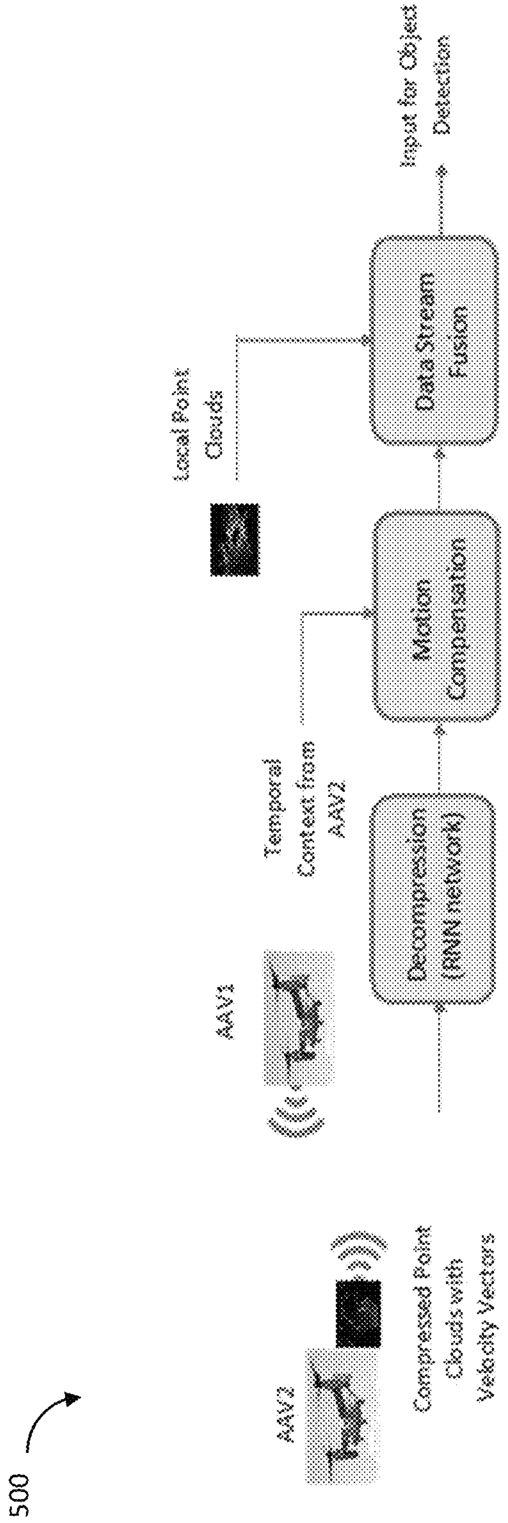
FIG. 5 illustrates a diagram of point cloud stream fusion according to various embodiments of the present disclosure.

For the point cloud stream, fusion of the data from different resources is needed. The velocity vectors of the dynamic objects are extracted and transmitted along with the compressed point clouds to enable reconstruction by dead reckoning at the receiver. FIG. 5 illustrates an exemplary process 500 of data fusion according to one embodiment of the present disclosure. The following exemplary steps of the process 500 will be executed during the fusion process. 1) The sender AAV2 estimates the velocity vectors of the dynamic objects (e.g. surrounding vehicles) in its captured point clouds. 2) Temporal context (i.e., velocity vectors) will be transmitted to help the receiver AAV1 to better predict the motion state of dynamic objects in the received point clouds and compensate for the transmission delay when fusing the point clouds from other AAVs with its own point clouds. 3) Adaptive frame transmission of compressed full point cloud frames with velocity vectors, only dynamic object point clouds with velocity vectors, or the object type (AAV, bird, etc.) of detected objects with positions and velocity vectors is performed.

In the process 500, the AAV1 receives the compressed point clouds with velocity vectors from the AAV2. The AAV1 performs decompression on the compressed point clouds using the RNN network. The AAV1 then uses the temporal context (i.e., the velocity vectors) from the AAV2 to perform motion compensation for the dynamic objects. The AAV1 performs data stream fusion by fusing the local point clouds of the AAV1 with the point clouds and the velocity vectors received from the AAV2, which can be used as input by the AAV1 for object detection.

It should be noted that fusion that leverages multiple types of sensor data (LiDAR, camera, radar, etc.) with complementary characteristics can enhance perception. In some embodiments, 3D LiDAR data fusion may be performed. In some embodiments, fusion of multiple types of sensor data may be performed.

As described, the present disclosure provides an intelligent cooperative perception (iCOOPER) system for autonomous air vehicles (AAVs). The iCOOPER comprises at least two AAVs, each of the at least two AAVs being provided with at least one object detection sensor. The at least two AAVs configured to perform: an information-centric networking (ICN) scheme configured for flexible and efficient communications among the at least two AAVs and infrastructure sensors; a deep reinforcement learning scheme including selecting sensory data to be transmitted, selecting data compression format, mitigating wireless network load, and reducing network latency; an efficient real-time compression scheme of 3D point cloud streams based on recurrent neural network (RNN) algorithms and including significantly reducing data amount exchanged among the at least two AAVs, network load and delay while maintaining accurate cooperative perception; and an effective point cloud fusion scheme including compensating network latency and accurately fusing sensed data from the at least two AAVs and the infrastructure sensors.

The deep reinforcement learning scheme comprises a deep reinforcement learning-based adaptive transmission scheme. The deep reinforcement learning-based adaptive transmission scheme includes dynamically determining an optimal transmission policy of real-time sensed data of a detected object based on the importance of the sensed data, location and trajectory of the detected object, and wireless network state. the deep reinforcement learning scheme comprises an Actor Critic neural network.

The ICN scheme includes naming, publishing, requesting, retrieving and/or subscribing sensory data. The ICN scheme includes naming and accessing sensory data based on sensed regions with multiple resolutions. The ICN scheme comprises a data preprocessing and naming scheme including organizing sensory data based on its region in an Octree structure with multiple resolutions.

The 3D point cloud streams include sensory data of objects sensed by the at least one sensor. The at least one sensor includes one selected from a group consisting of LiDAR, stereo camera, and radar.

The effective point cloud fusion scheme including velocity vector estimation at a sender and network latency compensation at a receiver, the sender being a first AAV of the at least two AAVs and the receiver being a second AAV of the at least two AAVs.

As described, the present disclosure further provides a device of an intelligent cooperative perception (iCOOPER). The device comprises an AAV, and the AAV comprises at least one local sensor, a perception module, a localization module, a mapping module, a path planner module and a controller. The perception module analyzes point cloud data from the at least one local sensor and sensors of other AVVs and recognizes detected objects from the point cloud data using a convolutional neural network (CNN) scheme. The localization module publishes the AAV's position, orientation and velocity state. The mapping module generates a global map with positions of the detected objects. The path planning module computes a path for the AAV and handles emergency events. And the controller issues commands to control the AAV based on the path.

The perception module further preprocesses and names sensory data of the at least one local sensor and organizes the sensory data based on its region in an Octree structure with multiple resolutions. The perception module further compresses sensory data of the at least one local sensor using recurrent neural network (RNN) algorithms. The perception module further decompresses compressed sensory data received from other AAVs and infrastructure sensors, and fuses the decompressed sensory data with sensory data of the at least one local sensor. The perception module further performs a deep reinforcement learning-based adaptive transmission scheme including selecting sensory data of the at least one local sensor to be transmitted, selecting data compression format, mitigating wireless network load, and reducing network latency. The at least one local sensor includes one selected from a group consisting of LiDAR, stereo camera, and radar.

The present disclosure further provides a method. FIG. 6 shows an example of computer-implemented method 600 for an intelligent cooperative perception (iCOOPER) system for autonomous air vehicles (AAVs), according to an embodiment of the disclosure. The example method 600 may be implemented in the example systems/processes/devices of intelligent cooperative perception (iCOOPER) for autonomous air vehicles (AAVs). The example method 600 may be performed/executed by a hardware processor of a computer system. The example method 600 may comprise, but not limited to, the following steps. The following steps of the method 600 may be performed sequentially, in parallel, independently, separately, in any order, or in any combination thereof. Further, in some embodiments, one or more of the following steps of the method 600 may be omitted, and/or modified. In some embodiments, one or more additional steps may be added or included in the method 600.

The method 600 may be implemented in a distributed deep reinforcement learning-based intelligent cooperative perception system with information-centric networking for autonomous air vehicles (AAVs) that may comprise: an information-centric networking (ICN) scheme for flexible and efficient communications, which allows AAVs to flexibly name, publish, request and retrieve/subscribe sensory information for cooperative perception; a deep reinforcement learning scheme to select the information to transmit as well as data compression format, mitigating network load, reducing latency, and optimizing cooperative perception; an efficient real-time compression model of 3D point cloud streams, which significantly reduce the amount of data exchanged among AAVs as well as network load and delay while maintaining accurate cooperative perception based on Recurrent Neural Network (RNN); and an effective point cloud fusion scheme, which can compensate network latency and accurately fuse the sensed data from different AAVs. For example, the iCOOPER system may comprise at least two AAVs, each of the at least two AAVs being provided with at least one object detection sensor.

In step 610, the AAVs of iCOOPER perform an information-centric networking (ICN) scheme configured for flexible and efficient communications among the at least two AAVs and infrastructure sensors. In step 620, the AAVs of iCOOPER perform a deep reinforcement learning scheme including selecting sensory data of the at least one object detection sensor to be transmitted, selecting data compression format, mitigating wireless network load, and reducing network latency; in step 630, the AAVs of iCOOPER perform an efficient real-time compression scheme of 3D point cloud streams based on recurrent neural network (RNN) algorithms and including significantly reducing data amount exchanged among the at least two AAVs, network load and delay while maintaining accurate cooperative perception; and in step 640, the AAVs of iCOOPER perform an effective point cloud fusion scheme including compensating network latency and accurately fusing sensed data from the at least two AAVs and the infrastructure sensors.

As described above, the deep reinforcement learning scheme comprises a deep reinforcement learning-based adaptive transmission scheme that includes dynamically determining an optimal transmission policy of real-time sensed data of a detected object based on the importance of the sensed data, location and trajectory of the detected object, and wireless network state to achieve the best cooperative perception in terms of object detection precision and latency. The effective point cloud fusion scheme includes velocity vector estimation at a sender and network latency compensation at a receiver, the sender being a first AAV of the at least two AAVs and the receiver being a second AAV of the at least two AAVs The region-based naming scheme of sensed information includes naming and accessing the sensory information based on the sensed region with multiple resolutions. The efficient real-time compression scheme of 3D point cloud streams comprises a Recurrent Neural Network (RNN)-based point cloud stream compression model. The effective point cloud fusion scheme includes RNN-based data decompression scheme.

Figure 7:
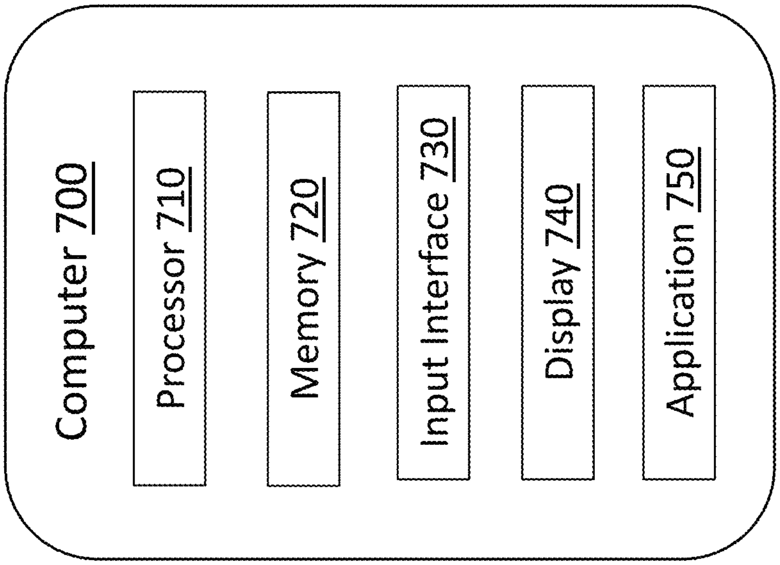
FIG. 7 illustrates an example computer system for point cloud compression of an intelligent cooperative perception (iCOOPER) for autonomous air vehicles (AAVs) according to one embodiment of the present disclosure.

FIG. 7 illustrates an example computer system 700 according to the present disclosure. The computer system 700 may be used in the iCOOPER systems disclosed herein for performing the methods/functions disclosed herein. The computer system 700 may include, but not limited to, a desktop computer, a laptop computer, a notebook computer, a smartphone, a tablet computer, a mainframe computer, a server computer, a personal assistant computer, and/or any suitable network-enabled computing device or part thereof. For example, the computer system 700 may be incorporated in the AAVs, such as in the controller or processor of an AAV (a device). The computer system 700 may comprise a processor 710, a memory 720 coupled with the processor 710, an input interface 730, a display 740 coupled to the processor 710 and/or the memory 720, and an application 750.

The processor 710 may include one or more central processing cores, processing circuitry, built-in memories, data and command encoders, additional microprocessors, and security hardware. The processor 710 may be configured to execute computer program instructions (e.g., the application 750) to perform various processes and methods disclosed herein.

The memory 720 may include random access memory, read-only memory, programmable read-only memory, read/write memory, and flash memory. The memory 720 may also include magnetic disks, optical disks, floppy disks, hard disks, and any suitable non-transitory computer-readable storage medium. The memory 720 may be configured to access and store data and information and computer program instructions, such as the application 750, an operating system, a web browser application, and so forth.

The input interface 730 may include graphic input interfaces and any device for entering information into the computer system 700, such as keyboards, mouses, microphones, digital cameras, video recorders, and the like.

The display 740 may include a computer monitor, a flat panel display, a liquid crystal display, a plasma panel, and any type of device for presenting information to users. For example, the display 740 may comprise the interactive graphical user interface (GUI).

The application 750 may include one or more applications comprising instructions executable by the processor 710, such as the methods disclosed herein. The application 750, when executed by the processor 710, may enable network communications among components/layers of the systems disclosed herein. Upon execution by the processor 710, the application 750 may perform the steps and functions described in this disclosure.

The present disclosure further provides a non-transitory computer-readable storage medium storing instructions that, when executed by one or more processors of one or more computers, cause the one or more processors to perform a method implemented in an intelligent cooperative perception (iCOOPER) system for autonomous air vehicles (AAVs). The iCOOPER system comprises at least two AAVs and each of the at least two AAVs is provided with at least one object detection sensor. The method comprises: performing an information-centric networking (ICN) scheme configured for flexible and efficient communications among the at least two AAVs and infrastructure sensors; performing a deep reinforcement learning scheme including selecting sensory data of the at least one object detection sensor to be transmitted, selecting data compression format, mitigating wireless network load, and reducing network latency; performing an efficient real-time compression scheme of 3D point cloud streams based on recurrent neural network (RNN) algorithms and including significantly reducing data amount exchanged among the at least two AAVs, network load and delay while maintaining accurate cooperative perception; and performing an effective point cloud fusion scheme including compensating network latency and accurately fusing sensed data from the at least two AAVs and the infrastructure sensors.

Other embodiments of the disclosure will be apparent to those skilled in the art from consideration of the specification and practice of the invention disclosed herein. It is intended that the specification and examples be considered exemplary only, with a true scope and spirit of the invention being indicated by the claims.

What is claimed is:

1. An intelligent cooperative perception (iCOOPER) system for autonomous air vehicles (AAVs), comprising at least two AAVs, each of the at least two AAVs being provided with at least one object detection sensor, and the at least two AAVs configured to perform:

an information-centric networking (ICN) scheme configured for communications among the at least two AAVs and infrastructure sensors;

a deep reinforcement learning scheme including selecting sensory data of the at least one object detection sensor to be transmitted, and selecting data compression format;

a real-time compression scheme of 3D point cloud streams based on recurrent neural network (RNN) algorithms and including reducing data amount exchanged among the at least two AAVs, network load and delay while maintaining cooperative perception; and a point cloud fusion scheme including: estimating velocity vectors of dynamic objects in point clouds captured by a sender AAV, transmitting the estimated velocity vectors together with compressed point clouds to a receiver AAV, compensating for network latency at the receiver AAV using the transmitted velocity vectors to predict motion states of the dynamic objects, and fusing the latency-compensated point clouds from the sender AAV with local point clouds of the receiver AAV.

2. The iCOOPER system of claim 1, wherein the deep reinforcement learning scheme comprises a deep reinforcement learning-based adaptive transmission scheme.

3. The iCOOPER system of claim 2, wherein the deep reinforcement learning-based adaptive transmission scheme includes dynamically determining a transmission policy of real-time sensed data of a detected object based on the importance of the sensed data, location and trajectory of the detected object, and wireless network state, so as to maximize object detection precision while satisfying bandwidth and delay constraints.

4. The iCOOPER system of claim 1, wherein the ICN scheme includes naming, publishing, requesting, retrieving and/or subscribing sensory data.

5. The iCOOPER system of claim 1, wherein the ICN scheme includes naming and accessing sensory data based on sensed regions with multiple resolutions.

6. The iCOOPER system of claim 1, wherein the 3D point cloud streams include sensory data of objects sensed by the at least one object detection sensor.

7. The iCOOPER system of claim 1, wherein the at least one object detection sensor includes one selected from a group consisting of LiDAR, stereo camera, and radar.

8. The iCOOPER system of claim 1, wherein the ICN scheme comprises a data preprocessing and naming scheme including organizing sensory data based on its region in an Octree structure with multiple resolutions.

9. The iCOOPER system of claim 1, wherein the deep reinforcement learning scheme comprises an Actor Critic neural network.

10. A method implemented in an intelligent cooperative perception (iCOOPER) system for autonomous air vehicles (AAVs), the iCOOPER system comprising at least two AAVs and each of the at least two AAVs being provided with at least one object detection sensor, and the method comprising:

performing an information-centric networking (ICN) scheme configured for communications among the at least two AAVs and infrastructure sensors;

performing a deep reinforcement learning scheme including selecting sensory data of the at least one object detection sensor to be transmitted, and selecting data compression format;

performing a real-time compression scheme of 3D point cloud streams based on recurrent neural network (RNN) algorithms and including reducing data amount exchanged among the at least two AAVs, network load and delay while maintaining cooperative perception; and performing a point cloud fusion scheme including: estimating velocity vectors of dynamic objects in point clouds captured by a sender AAV, transmitting the estimated velocity vectors together with compressed point clouds to a receiver AAV, compensating for network latency at the receiver AAV using the transmitted velocity vectors to predict motion states of the dynamic objects, and sensors fusing the latency-compensated point clouds from the sender AAV with local point clouds of the receiver AAV.

11. The method of claim 10, wherein the deep reinforcement learning scheme comprises a deep reinforcement learning-based adaptive transmission scheme that includes dynamically determining a transmission policy of real-time sensed data of a detected object based on the importance of the sensed data, location and trajectory of the detected object, and wireless network state, so as to maximize object detection precision while satisfying bandwidth and delay constraints.

12. The method of claim 10, wherein the at least one object detection sensor includes one selected from a group consisting of LiDAR, stereo camera, and radar.

13. The method of claim 10, wherein the point cloud fusion scheme includes velocity vector estimation at a sender and network latency compensation at a receiver, the sender being a first AAV of the at least two AAVs and the receiver being a second AAV of the at least two AAVs.

* * * * *